Oct. 26, 1948.  E. E. TURNER, JR  2,452,085
MEANS FOR THE INTERCHANGE OF ELECTRICAL
AND ACOUSTICAL ENERGY
Filed Aug. 6, 1942  2 Sheets-Sheet 1

INVENTOR
Edwin E. Turner Jr.
BY Ezekiel Wolf
ATTORNEY

Oct. 26, 1948.   E. E. TURNER, JR   2,452,085
MEANS FOR THE INTERCHANGE OF ELECTRICAL
AND ACOUSTICAL ENERGY
Filed Aug. 6, 1942   2 Sheets-Sheet 2

INVENTOR
Edwin E. Turner Jr.
BY
ATTORNEY

Patented Oct. 26, 1948

2,452,085

UNITED STATES PATENT OFFICE 2,452,085

MEANS FOR THE INTERCHANGE OF ELECTRICAL AND ACOUSTICAL ENERGY

Edwin E. Turner, Jr., West Roxbury, Mass., assignor, by mesne assignments, to Submarine Signal Company, Boston, Mass., a corporation of Delaware Application August 6, 1942, Serial No. 453,909

6 Claims. (Cl. 177—386)

The present invention relates to a submarine signaling device and more particularly to a system which might be used either for sending or receiving.

The present invention is particularly useful for sending and receiving in a given plane normal to the axis of the unit itself, for the unit in the present form may be used in an elongated form in a direction at right angles to the direction of radiation.

The present invention may be applied to magnetostriction devices or to devices energized by other means, as, for instance, piezoelectric crystals. In the form of the apparatus when energized by magnetostrictive means a central core is provided which, when energized by alternating current, produces radial vibrations in an elongated shell which may be transmitted to the water or the other sound propagating medium.

Figure 1:
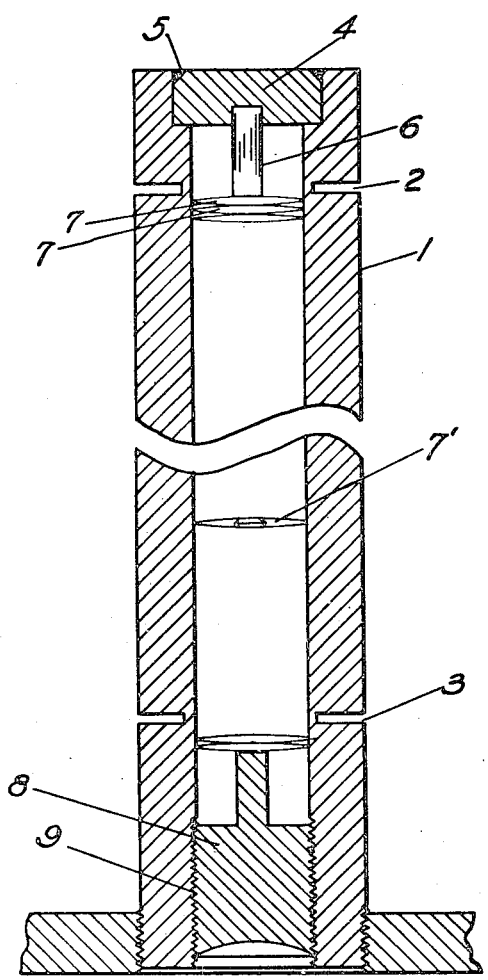
Figure 2:
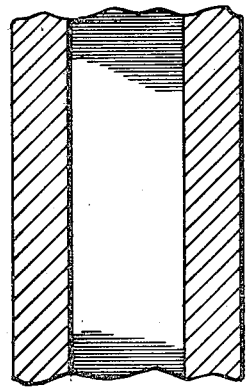
Figure 5:
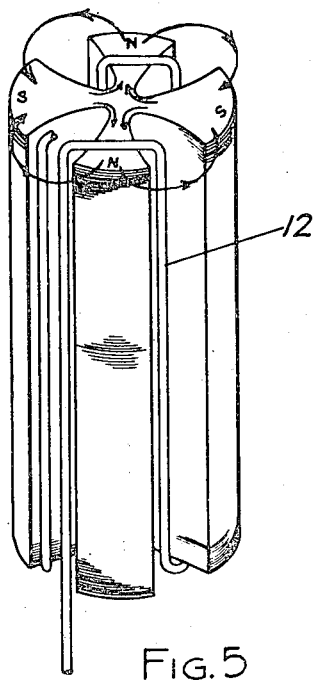
Figures 3, 4:
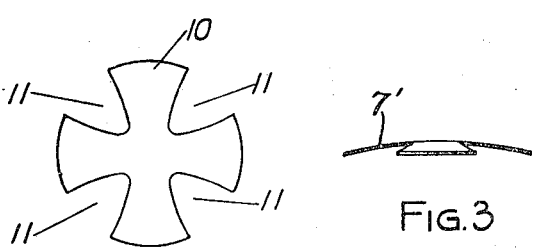
Figure 6:
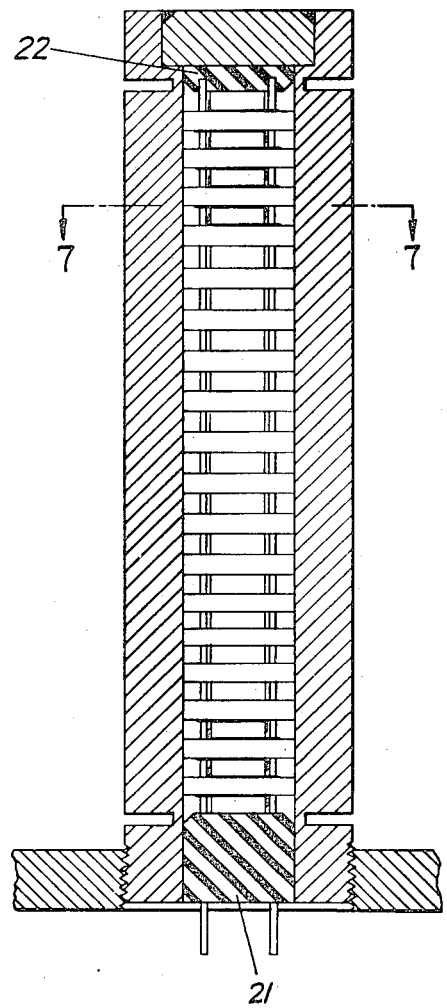
Figure 7:
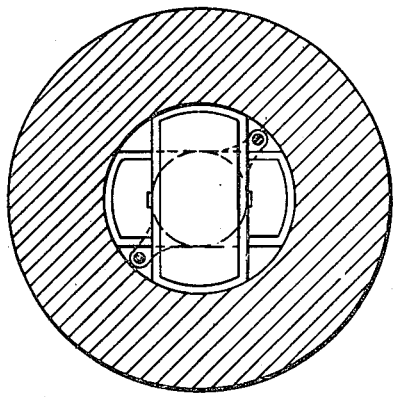
Figure 8:
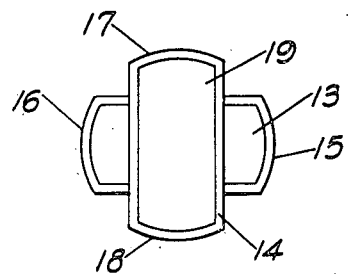
Figure 9:
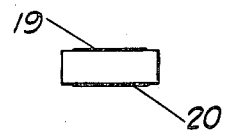

Without further description of the merits and advantages of the present invention which will be more completely understood and appreciated from the description in the specification below, the invention will now be described in connection with the drawings showing the embodiment of the invention in which Fig. 1 shows an elevated broken sectional view in the assembly of the invention; Fig. 2 shows a fragmentary section elevation; Fig. 3 shows an edge view of a lamination used in Fig. 2; Fig. 4 shows a plan view of the same lamination; Fig. 5 shows a laminated stack with its energizing coil; Fig. 6 shows a sectional elevation of a form of apparatus using piezoelectric crystals; Fig. 7 is a section on line 7—7 of Fig. 6; and Figs. 8 and 9 show detail arrangements of the crystal and the electrodes of the device of Fig. 6.

In the invention there is provided a cylindrical shell 1 which should preferably have a thickness less than the order of a one-quarter wave length of the wave which is to be propagated radially through the shell. As a matter of fact, shells thinner than this may in most cases preferably be used. At each end of the cylinder there is provided a circumferential groove 2 and 3 so as to permit the vibrational section between the two grooves free radial vibration without any clamping effect due to the end of the casing. As indicated in Fig. 1, one end of the casing may be closed by a plug member 4 welded to the cylinder around its edge as indicated at 5. This plug member may have centrally located a rod or bar 6 which, when the whole unit is assembled, bears against the laminations 7—7 stacked together the length of the cylinder between the grooves 2 and 3. These laminations 7 are placed in a plane perpendicular to the axis of the cylinder. The laminations may be dished as indicated by the laminations 7' and may be stacked alternately in opposite directions so that their concave surfaces face each other. The laminations themselves are of such a diameter that they will fit uniformly and readily in the cylindrical opening. When the laminations are all put in place within the cylinders, then they are taken up by means of the plug member 8 at the free end of the tube and this plug member may be threaded into the cylinder as indicated by the threads at 9 and thereby the dished laminations are forced together exerting radial pressure against the cylinder making a tight acoustic and mechanical joint with the inner wall of the cylindrical element 1. The laminated disc member 7, as will be noted in Figs. 3 and 4, comprises sectors 10 having material and cut-out sectors 11. The cut-out sectors may be four in number and through these sectors are wound the electrical coil for energizing or receiving the translated energy from the acoustic field or from the electrical oscillator. In place of dishing the laminations as shown at 7', the laminations may be made flat and a forced fit joint may be used. In this case the cylinder itself may be made to expand to receive the laminations or the laminations may be contracted by the use of a cold element as, for instance, dry ice, and then inserted in the cylinder after which they are allowed to expand to normal temperature.

It will be noted from a consideration of Fig. 5 that the coil 12 is threaded around each sector 10 successively although other methods of winding may be used. The winding of the coil as indicated in Fig. 5 will generate a magnetic flux in each of the four arms of the laminated block and if the block is of magnetostrictive material, then radial vibrations will be obtained. A resonance may be established in the block by choice of its dimensions and material and also in the ring section of the cylinder 1, the two resonant structures being coupled together by the pressure of the block against the cylinder. It is preferable in most cases that the material 1 of the cylinder be permeable to magnetic flux.

In the arrangement indicated in Figs. 6, 7, 8 and 9 the same general construction indicated in Fig. 1 is employed except that in this case the edges of the crystals are accurately cut to fit in the cylinder. As will be seen in Figs. 8 and 9, the crystals 13 and 14 are elongated and laid crosswise along diameters of the circular section of the cylinder at right angles to each other. The edges 15 and 16 of the crystal 13 bear against the inner wall of the cylinder and are cemented to it with some suitable cement and similarly the edges 17 and 18 of the crystal 14. The crystals are provided with electrodes 19 and 20 on their elongated faces, the electrode 20 on the underside of the crystal making electrical contact with the electrode on the crystal arranged crosswise to it. These crystals may be held in place by rubber or insulating plugs 21 at the bottom and 22 at the top of the unit.

In the crystal structure electrical potentials produced across the electrodes will produce longitudinal vibrations in the crystal acting upon the cylindrical walls and therefore produce radial vibration of the cylindrical elements. The structure may be tuned in the same general manner as the structure of Fig. 1 and resonance may be established by choosing the material thickness and dimension of the cylinder in connection with the use of the piezoelectric crystal elements. Various types of crystals may be employed but it is preferable to use in this connection a piezoelectric crystal of great activity such as Rochelle salt.

A divisional application, Serial No. 15,391, was filed March 17, 1948, claiming the species of Figs. 6 through 9.

Having now described my invention, I claim:

1. Means for the interchange of electrical and acoustical energy comprising a hollow cylindrical element the outer surface of which serves to radiate and receive compressional wave energy, a stack of laminations positioned in said cylindrical element with the plane of each said lamination being substantially at right angles to the axis of the cylinder, said laminations being of a magnetostrictive material and initially having a dished form and means provided at one end of said cylinder for compressing said laminations therein to make a good acoustic coupling between the edges of the laminations and the inner walls of the cylinder.

2. Means for the interchange of electrical and acoustical energy comprising a hollow cylindrical element, said cylinder being closed at both ends, and a stack of laminations positioned in said cylindrical element with the plane of each said lamination being substantially at right angles to the axis of the cylinder, said cylinders having a deep external groove beyond the position occupied by the laminations in the direction of the ends of the cylinder.

3. Means for the interchange of electrical and acoustical energy comprising a hollow cylindrical element, said cylinder being closed at both ends, and a stack of laminations positioned in said cylindrical element with the plane of each said lamination being substantially at right angles to the axis of the cylinder, said cylinders having a deep external groove beyond the position occupied by the laminations in the direction of the ends of the cylinder, and means retaining said laminations in said position.

4. Means for the interchange of electrical and acoustical energy comprising a hollow cylindrical element, a stack of magnetostrictive laminations having substantially the shape of a cross with the edges thereof making contact with the inner wall of the cylindrical casing, a coil element wound about the stack of laminations about the stems of the cross for providing interchange of electrical energy to and from the magnetostrictive laminations.

5. Means for the interchange of electrical and acoustical energy comprising a hollow cylindrical element, a stack of magnetostrictive laminations having substantially the shape of a cross with the edges thereof making contact with the inner wall of the cylindrical casing, a coil element wound about the stack of laminations about the stems of the cross for providing interchange of electrical energy to and from the magnetostrictive laminations, and means providing at the ends of the cylinder for retaining said laminations within the cylinder.

6. Means for the interchange of electrical and acoustical energy comprising a hollow cylindrical element, a stack of magnetostrictive laminations having substantially the shape of a cross with the edges thereof making contact with the inner wall of the cylindrical casing, a coil element wound about the stack of laminations about the stems of the cross for providing interchange of electrical energy to and from the magnetostrictive laminations, and means providing at the ends of the cylinder for retaining said laminations within the cylinder, said means comprising elements closing the ends of the cylinder and having rods centrally located bearing on the central portion of said laminations.

EDWIN E. TURNER, JR.

REFERENCES CITED

The following references are of record in the file of this patent:

UNITED STATES PATENTS

| Number | Name | Date |
| --- | --- | --- |
| 1,495,429 | Nicolson | May 27, 1924 |
| 1,788,402 | Nicolson | Jan. 13, 1931 |
| 1,985,251 | Hayes | Dec. 25, 1934 |
| 2,051,200 | Christenson | Aug. 18, 1936 |
| 2,076,330 | Wood et al. | Apr. 6, 1937 |
| 2,088,324 | John | July 27, 1937 |
| 2,116,522 | Kunze | May 10, 1938 |
| 2,190,666 | Kallmeyer | Feb. 20, 1940 |
| 2,384,465 | Harrison | Sept. 11, 1945 |

FOREIGN PATENTS

| Number | Country | Date |
| --- | --- | --- |
| 620,484 | Germany | Oct. 22, 1935 |